(12) United States Patent
Saita (10) Patent No.: US 9,338,154 B2
(45) Date of Patent: May 10, 2016

(54) AUTHENTICATION APPARATUS, AUTHENTICATION METHOD, AND NON-TRANSITORY COMPUTER READABLE MEDIUM STORING PROGRAM

(71) Applicant: FUJI XEROX CO., LTD., Tokyo (JP)

(72) Inventor: Nao Saita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 104 days.

(21) Appl. No.: 13/890,778

(22) Filed: May 9, 2013

(65) Prior Publication Data

US 2014/0096191 A1 Apr. 3, 2014

(30) Foreign Application Priority Data

Oct. 2, 2012 (JP) ................................. 2012-220075

(51) Int. Cl.
*G06F 21/00* (2013.01)
*H04L 29/06* (2006.01)
*G06F 21/34* (2013.01)

(52) U.S. Cl.
CPC ............... *H04L 63/08* (2013.01); *G06F 21/34* (2013.01)

(58) Field of Classification Search
CPC ................................ H04L 63/08; G06F 21/34
USPC ........................................................... 726/3
See application file for complete search history.

(56) References Cited

U.S. PATENT DOCUMENTS

| | | | | |
|---|---|---|---|---|
| 4,766,294 A | * | 8/1988 | Nara et al. | ..................... 235/380 |
| 5,857,024 A | * | 1/1999 | Nishino et al. | ................ 713/172 |
| 7,134,015 B2 | * | 11/2006 | Kulack et al. | ................. 713/166 |
| 2001/0053299 A1 | * | 12/2001 | Matsunoshita et al. | ........ 399/366 |
| 2003/0054805 A1 | * | 3/2003 | Fujisawa et al. | ............. 455/414 |
| 2007/0234429 A1 | | 10/2007 | Mizutani | |
| 2008/0104667 A1 | * | 5/2008 | Terada | ............................. 726/2 |
| 2009/0300733 A1 | * | 12/2009 | Inomata et al. | .................... 726/5 |
| 2011/0102274 A1 | * | 5/2011 | Fujisawa | ....................... 343/702 |

FOREIGN PATENT DOCUMENTS

| | | |
|---|---|---|
| JP | 2000-132260 A | 5/2000 |
| JP | 2008-158778 A | 7/2008 |
| JP | A-2010-90582 | 4/2010 |
| JP | 2011-013934 A | 1/2011 |
| JP | 2011-065484 A | 3/2011 |
| JP | 2011-185005 A | 9/2011 |

OTHER PUBLICATIONS

Dec. 7, 2015 Office Action issued in Japanese Patent Application No. 2012-220075.

* cited by examiner

*Primary Examiner* — Yin-Chen Shaw
*Assistant Examiner* — John B King
(74) *Attorney, Agent, or Firm* — Oliff PLC (57) ABSTRACT

An authentication apparatus includes a detection unit that detects whether or not communication with a portable storage medium storing identification information for identifying a user is able to be performed, a reading unit that reads identification information stored in the storage medium when the detection unit detects that the communication is able to be performed, a time counting unit that counts an elapsed time, a determination unit that determines whether or not the elapsed time counted by the time counting unit matches a predefined time for the identification information read by the reading unit, and an authentication unit that authenticates the storage medium with which the detection unit detects that the communication is able to he performed when the determination unit determines that the elapsed time counted by the time counting unit matches the predefined time.

16 Claims, 7 Drawing Sheets

| CARD ID | OPERATION PATTERN |
|---|---|
| 1234 | FIRST OPERATION (1 SECOND), SECOND OPERATION (2 SECOND), THIRD OPERATION (5 SECOND); CARD IS HELD OVER / CARD IS SEPARATED: 2 SECOND, 1 SECOND, 2 SECOND |
| 5678 | FIRST OPERATION (2 SECOND), SECOND OPERATION (4 SECOND); CARD IS HELD OVER / CARD IS SEPARATED: 3 SECOND, 2 SECOND |
| ...... | ...... |

AUTHENTICATION APPARATUS, AUTHENTICATION METHOD, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2012-220075 filed Oct. 2, 2012.

BACKGROUND

Technical Field

The present invention relates to an authentication apparatus, an authentication method, and a non-transitory computer readable medium storing a program.

SUMMARY

According to an aspect of the invention, there is provided an authentication apparatus including a detection unit that detects whether or not communication with a portable storage medium storing identification information for identifying a user is able to he performed; a reading unit that reads identification information stored in the storage medium when the detection unit detects that the communication is able to be performed; a time counting unit that counts an elapsed time from the time when the detection unit detects that the communication with the storage medium is unable to he performed to the time when the detection unit detects that the communication is able to be performed again; a determination unit that determines whether or not the elapsed time counted by the time counting unit matches a predefined time for the identification information read by the reading unit; and an authentication unit that authenticates the storage medium with which the detection unit detects that the communication is able to be performed when the determination unit determines that the elapsed time counted by the time counting unit matches the predefined time.

BRIEF DESCRIPTION OF THE DRAWINGS

Exemplary embodiments of the present invention will be described in detail based on the following figures, wherein:

FIGS. 4A to 49 are diagrams exemplifying a display screen which displays time counted by a time counting unit shown in FIG. 2.

DETAILED DESCRIPTION

Hereinafter, an embodiment of the invention will be described.

Authentication Apparatus

Figure 1:
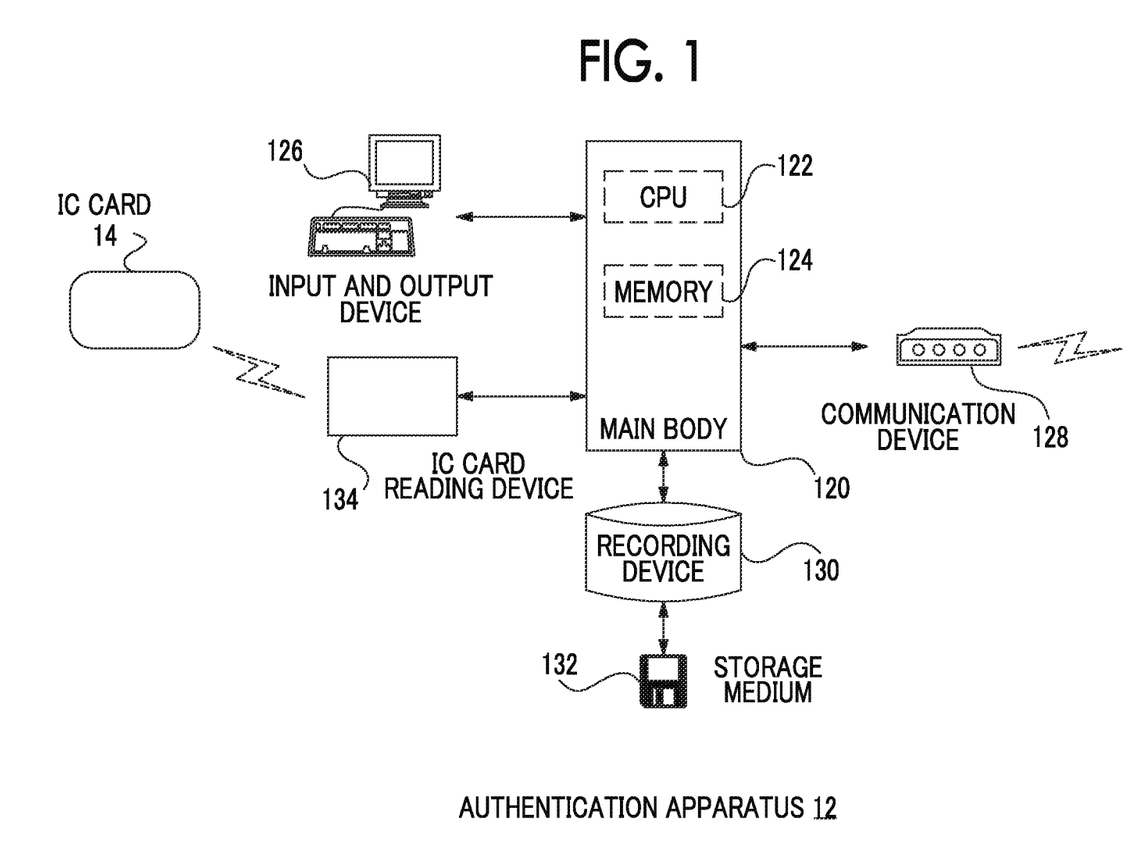
FIG. 1 is a diagram exemplifying a configuration of an authentication apparatus according to the present exemplary embodiment.

FIG. 1 is a diagram exemplifying a configuration of an authentication apparatus 12 used to carry out the exemplary embodiment of the invention.

As shown in FIG. 1, the authentication apparatus 12 includes a main body 120 having a CPU 122, a memory 124, and the like, an input and output device 126 having a touch panel, a display, and the like, a communication device 128 for performing data communication, a recording device 130 which writes and reads data in and from a storage medium 132 such as a HD, CD, DVD, FD, a nonvolatile memory, or a USE memory, an IC card reading device 134 which reads information stored in an IC card 14, and the like.

In other words, the authentication apparatus 12 has a constituent portion which is a computer capable of performing data reading, an information process such as authentication, and data communication with other devices.

Authentication Program

Figure 2:
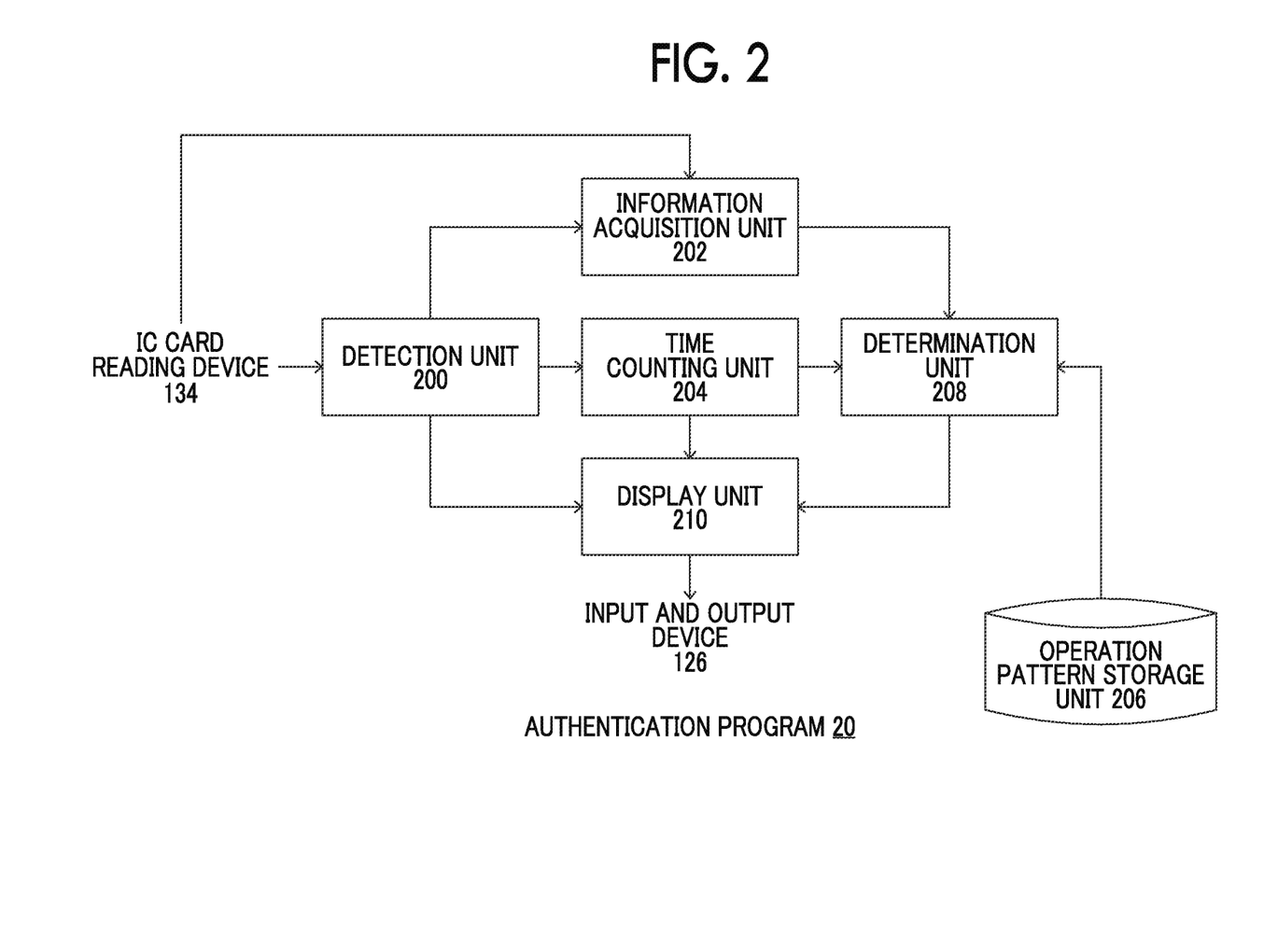
FIG. 2 is a diagram exemplifying a configuration of a program executed in the authentication apparatus shown in FIG. 1.

FIG. 2 is a diagram exemplifying a configuration of an authentication program 20 executed in the authentication apparatus 12 shown in FIG. 1.

As shown in FIG. 2, the authentication program 20 includes a detection unit 200, an information acquisition unit 202, a time counting unit 204, an operation pattern storage unit 206, a determination unit 208, and a display unit 210.

The authentication program 20 is, for example, loaded to the memory 124 of the authentication apparatus 12 via the storage medium 132 (FIG. 1), and is executed specifically using the hardware resources of the authentication apparatus 12 on an OS (not shown) which is executed in the authentication apparatus 12.

The authentication program 20 performs an authentication process of the IC card 14 on the basis of the time when the IC card 14 is held over the IC card reading device 134 (FIG. 1), and the time when the IC card 14 is separated from the IC card reading device 134.

The detection unit 200 detects that the IC card 14 is held over the IC card reading device 134 (FIG. 1) (that is, a state in which communication is able to be performed with the IC card 14), and notifies the information acquisition unit. 202 of acquiring information stored in the detected. IC card 14.

In addition, the detection unit 200 detects that the IC card 14 is separated from the IC card reading device 134 (that is, a state in which communication is unable to be performed with the IC card 14).

In addition, when it is detected that the IC card 14 is held over or the IC card 14 is separated, the detection unit. 200 notifies the time counting unit 204 of performing a timing counting process described later, and notifies the display unit 210 of performing a time display process described later.

The information acquisition unit 202 acquires information stored in the IC card 14 which is held over the IC card reading device 134 (FIG. 1) to output to the determination unit 208.

The information stored in the IC card 14 includes identification information (for example, an ID of an owner) for identifying an owner of the IC card 14.

When the notification is received from the detection unit 200, the time counting unit 204 starts counting time, and, when the notification is received from the detection unit 200 again, the time counting unit 204 finishes counting time, so as to output a counted time (for example, a second number) from the start of the counting to the finish thereof to the determination unit 208, to initialize (for example, 0 seconds) the counted time, and to start counting time again.

In other words, in a case where the time counting unit 204 is notified that the IC card 14 is held over and is notified again that the IC card 14 is separated by the detection unit 200, a counted time which is output to the determination unit 208 indicates the time (hereinafter, referred to as a "held-over time") when the IC card 14 is held over the IC card reading device 134.

In addition, in a case where the time counting unit 204 is notified that the IC card 14 is separated and is notified again that the IC card 14 is held over by the detection unit 200, a counted time which is output to the determination unit 208 indicates the time (hereinafter, referred to as a "separation time") when the IC card 14 is separated from the IC card reading device 134.

In addition, the time counting unit 204 outputs a counted elapsed time to the display unit 210 during the time counting.

Figure 3:
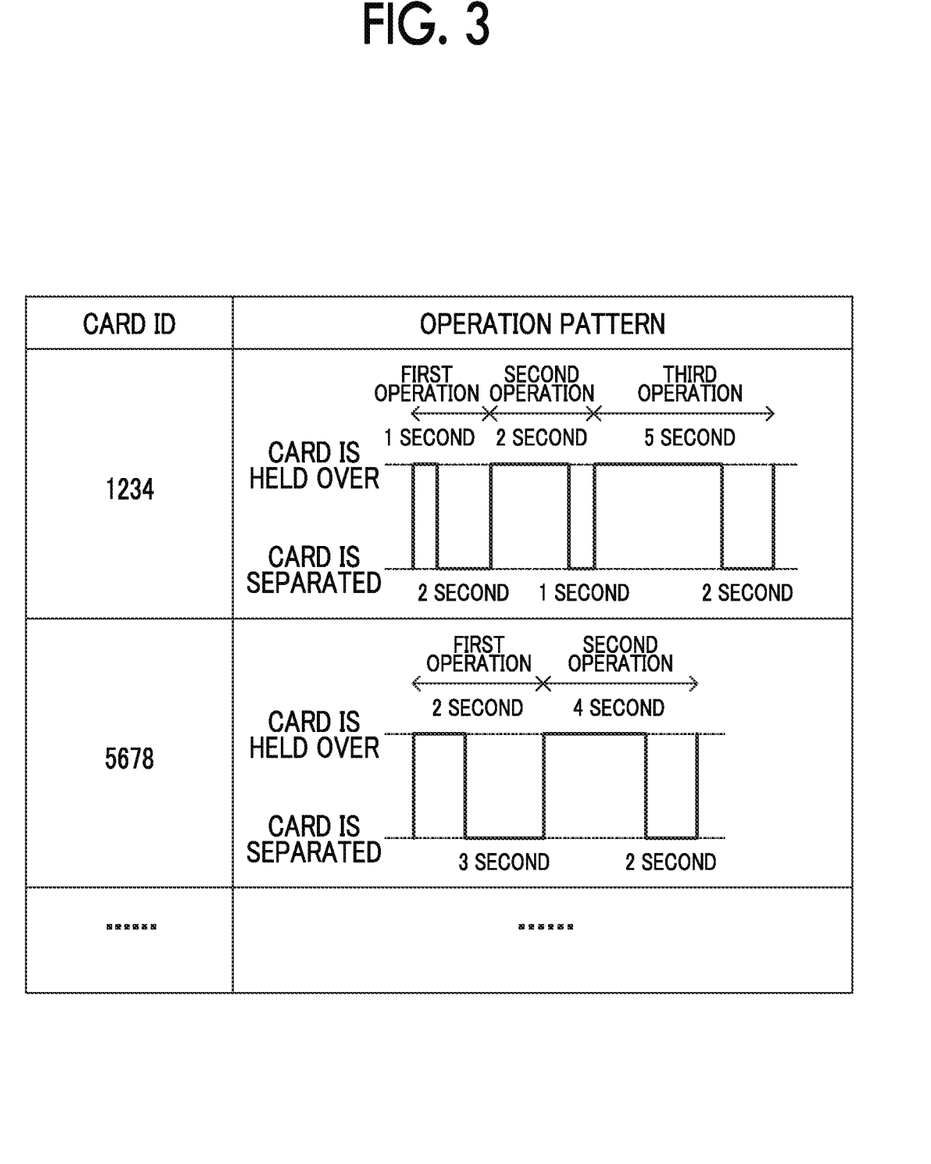
FIG. 3 is a diagram exemplifying operation pattern information stored in an operation pattern storage unit shown in FIG. 2.

FIG. 3 is a diagram exemplifying operation pattern information stored in the operation pattern storage unit 206. The operation pattern storage unit 206 stores the operation pattern information described below so as to be referred to by the determination unit 208.

As shown in FIG. 3, the operation pattern information indicates correlation between an ID which is uniquely identified and an operation pattern.

The operation pattern indicates the number of operations in which an operation of an owner of the IC card 14 holding and separating the IC card 14 over and from the IC card reading device 134 is set to one operation, and a held-over time and a separation time in each operation.

For example, as shown in FIG. 3, an operation pattern correlated with the ID "1234" indicates that the number of operations is three, a first held-over time is one second, a first separation time is two seconds, a second held-over time is three seconds, a second separation time is one second, a third held-over time is five seconds, and a third separation time is two seconds.

The determination unit 208 performs a determination process (which will be described in detail with reference to FIG. 5) for authenticating the IC card 14 on the basis of the identification information (ID) which is input from the information acquisition unit 202 and is stored in the IC card 14 (FIG. 1), the counted time input from the time counting unit 204, and the operation pattern information stored in the operation pattern storage unit 206.

In addition, the determination unit 208 outputs a determination result to the display unit 210.

FIGS. 4A to 4D are diagrams exemplifying a display screen which displays time counted by the time counting unit 204.

When a notification is received from the detection unit 200, the display unit 210 performs control such that an elapsed time input from the time counting; unit 204 is displayed on the input and output device 126 (FIG. 1).

Specifically, for example, the display unit 210 performs control such that an elapsed time input from the time counting unit 204 is displayed on the input and output device 126 as in the following (1) to (4).

Figure 4A:
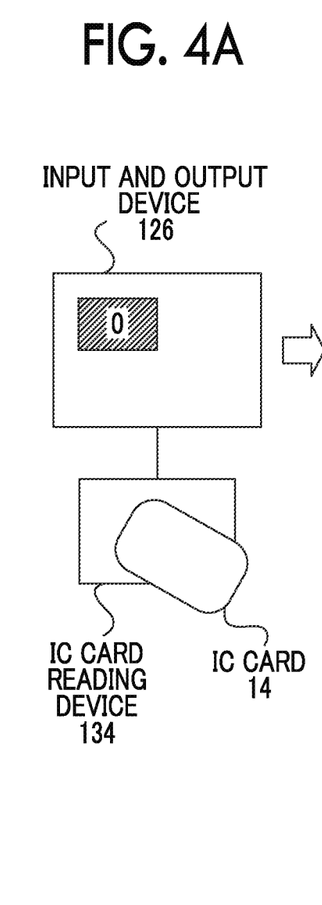

(1) When the IC card. 14 is held over the IC card reading device 134, the time counting unit 204 starts counting a held-over time, and thus "0" which is an initial value is displayed as an elapsed time on the input and output device 126 (FIG. 4A).

Figure 4B:
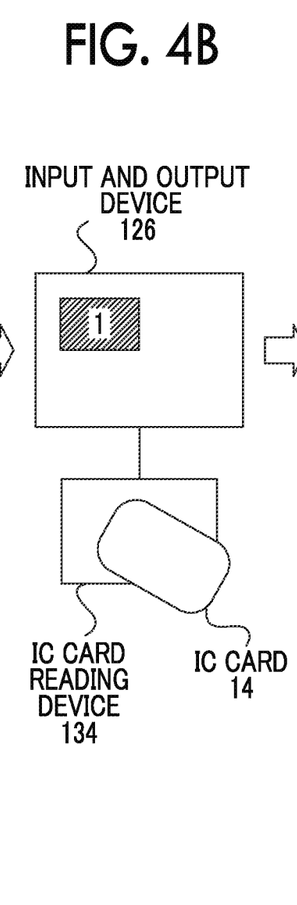

(2) When one second has elapsed after the IC card. 14 is held over, "1" is displayed as an elapsed time on the input and output device 126 (FIG. 4B).

Figure 4C:
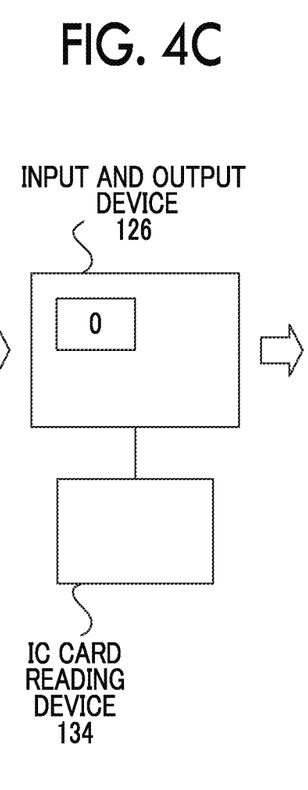

(3) When the IC card 14 is separated from the IC and reading device 134, the time counting unit 204 finishes counting the held-over time and starts counting a separation time, and thus "0" which is an initial value is displayed as an elapsed time on the input and output device 126 (FIG. 4C).

Figure 4D:
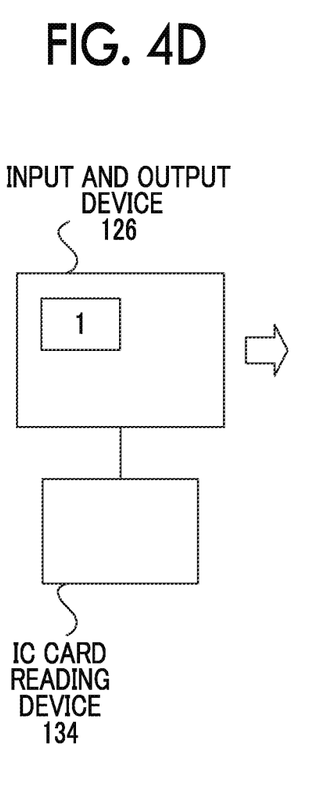

(4) When one second has elapsed after the IC card. 14 is separated, "1" is displayed as an elapsed time on the input and output device 126 (FIG. 4D).

In addition, as shown in FIGS. 4A to 4D, an elapsed time of the held-over time and an elapsed time of the separation time may be easily differentiated from each other, for example, by coloring the background of the display part of the elapsed time.

In addition, the display unit 210 performs control such that a message or the like corresponding to a determination result from the determination unit 208 is displayed on the input and output device 126 (FIG. 1).

Determination on Process

Figure 5:
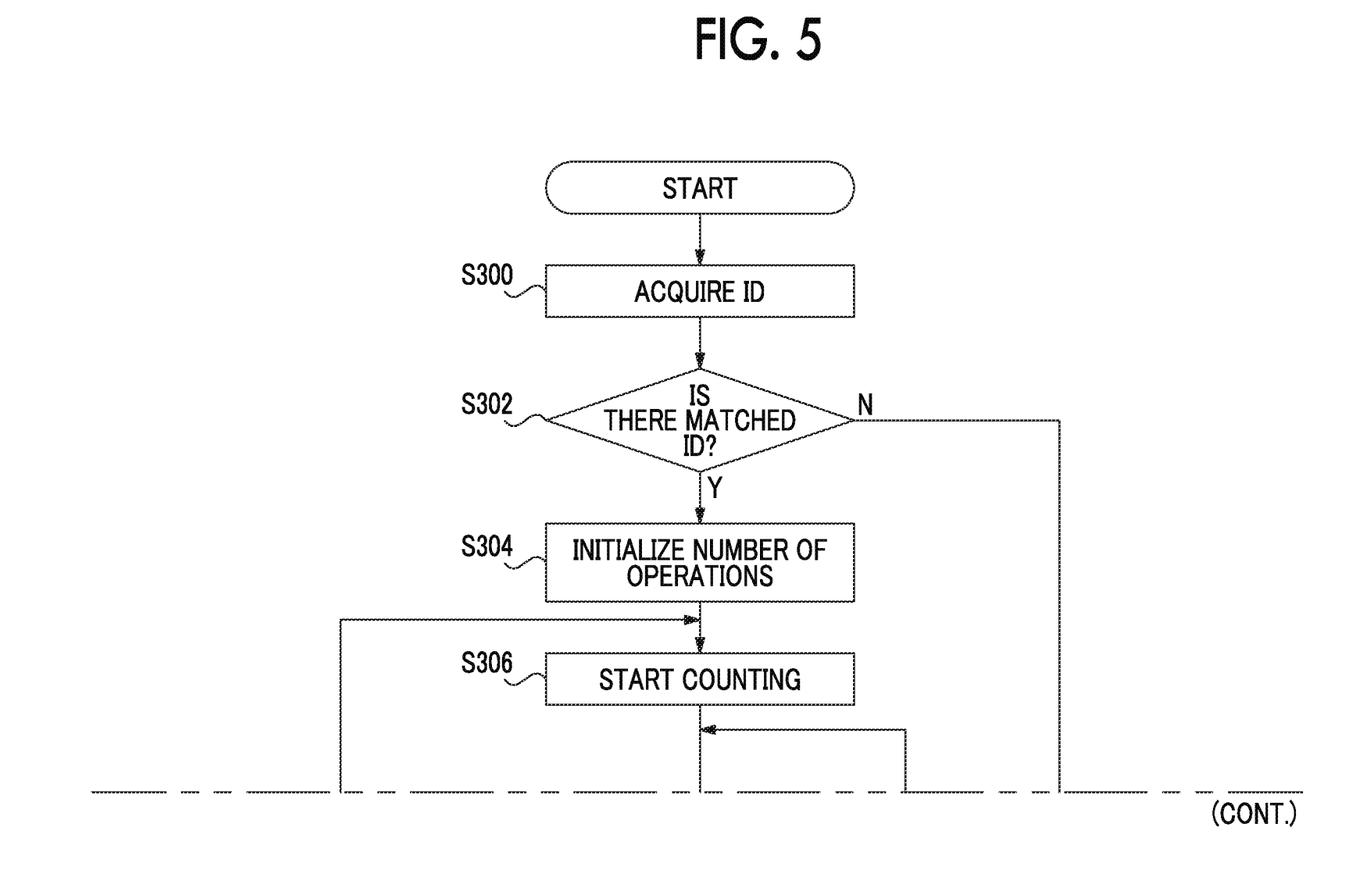
FIG. 5 is a flowchart exemplifying a determination process performed using a configuration of the program shown in FIG. 2.

FIG. 5 is a flowchart exemplifying a determination process for authentication of the IC card 14 (FIG. 1) performed by each constituent element of the authentication program 20 (FIG. 2).

Hereinafter, the determination process by each constituent element will he further described.

When the IC card 14 is held over the IC card reading device 134, the determination unit 208 acquires an ID stored in the IC card 14, input from the information acquisition unit. 202 in step 300 (S300).

In step 302 (S302), the determination unit 208 determines whether or not there is an ID matching the ID acquired in S300 in the operation pattern information stored in the operation pattern storage unit 206 by referring to the operation pattern storage unit 206.

If it is determined that there is a matched ID, the determination unit 208 proceeds to a process in S304, and, otherwise, the determination unit 208 proceeds to a process in S328.

In step 304 (S304), the determination unit 208 initializes the number of operations (for example, 0).

In step 306 (S306), the time counting unit 204 starts counting time (a held-over time).

In step 308 (S308), the determination unit 208 determines whether or not the detection unit 200 detects that there is no card (that is, the IC card 14 is separated from the IC card reading device 134).

If the determination unit 208 determined that the detection unit 200 detects that there is no card, the time counting unit 204 proceeds to a process in S310, and, otherwise, the detection unit 200 returns to the process in S308.

In step 310 (S310), the time counting unit 204 finishes counting time, and outputs the counted time (the held-over time) to the determination unit 208.

In step 312 (S312), the time counting unit 204 starts counting time (a separation time).

In step 314 (S314), the determination unit 208 determines whether or not the detection unit 200 detects that there is a card (that is, the IC card 14 is held over the IC card reading device 134).

If the determination unit 208 determines that the detection unit 200 detects that there is a card, the determination unit 208 proceeds to a process in S316, and, otherwise, the determination unit 208 returns to the process in S314.

In step 316 (S316), the determination unit 208 acquires an ID stored in the IC card 14 detected by the detection unit 200 in S314 from the information acquisition unit 202 and determines whether or not the ID matches the ID acquired in S300.

If the determination unit 208 determines that the ID matches the ID acquired in S300, the time counting unit 204 proceeds to a process in S318, and, otherwise, the determination unit 208 proceeds to a process in S328.

In step 318 (S318), the time counting unit 204 finishes counting time, and outputs the counted time (the separation time) to the determination unit 208.

In step 320 (S320), the determination unit 208 determines whether or not the number of operations is the same as the number of operations defined in an operation pattern corresponding to the ID acquired in S300 in the operation pattern information (FIG. 3) stored in the operation pattern storage unit 206.

If it is determined that the number of operations is the same as the number of operations defined in the operation pattern, the determination unit 208 proceeds to a process in S324, and, otherwise, the determination unit 208 proceeds to a process in S322.

In step 322 (S322), the determination unit 208 adds one to the number of operations and proceeds to the process in S306.

In step 324 (S324), the determination unit 208 determines whether or not the held-over time and the separation time input from the time counting unit 204 in S310 and S318 match a held-over time and a separation time defined in the operation pattern corresponding to the ID acquired in S300 in the operation pattern information (FIG. 3) stored in the operation pattern storage unit 206.

For example, in a case where the ID acquired in S300 indicates "1234", the first to third held-over times acquired in S310 are respectively one second, three seconds, and five seconds, and the first to third separation times acquired in S318 are respectively two second, one second, and two seconds, it is determined that the acquired operation pattern matches the operation pattern (FIG. 3) stored in the operation pattern storage unit 206.

If it is determined that the operation patterns match each other, the determination unit 208 proceeds to a process in S326, and, otherwise, the determination unit 208 proceeds to a process in S328.

In step 326 (S326), the determination unit 208 authenticates the IC card 14 (FIG. 1) storing the ID acquired in S300, outputs a determination result of authentication success to the display unit 210, and finishes the process.

In step 328 (S328), the determination unit 208 outputs a determination result of authentication failure to the display unit 210, and finishes the process.

In addition, in the determination process shown in FIG. 5, a held-over time and a separation time are counted and are used as an operation pattern; however, for example, only a separation time may be counted and used as an operation pattern, a separation time may be counted once and a held-over time may be counted in multiple times, which may be used as an operation pattern, or a held-over time may be counted once and a separation time may be counted in multiple times, which may be used as an operation pattern.

MODIFICATION EXAMPLE 1

In the exemplary embodiment of the invention, the operation pattern stored in the operation pattern storage unit 206 (FIG. 2) indicates "time" when the IC card 14 (FIG. 1) is held over or is separated from the IC card reading device 134, but may indicate a "counted number" displayed on the input and output device 126 under the control of the display unit 210.

The counted number is not limited to every second, and indicates a number counted at a random interval, for example, in a certain case, a counted number varies to 0, 1, . . . , every two seconds, and, in another case, a counted number varies to 0, 1, . . . every three seconds.

For example, in a predefined operation pattern, it is assumed that a counted number indicates 1 when the IC card 14 is held over the IC card reading device 134, and a counted number indicates 2 when the IC card 14 is separated therefrom.

For example, if a counted number displayed on the input and output device 126 indicates "1" under the control of the display unit 210, an owner of the IC card 14 separates the IC card 14 which is held over the IC card reading device 134, and if a counted number which is counted from 0 again indicates "2", the owner holds the IC card 14 which is separated over the IC card reading device 134. In this case, the operation pattern by the owner of the IC card 14 matches a predefined operation pattern, and thus the IC card 14 is authenticated.

MODIFICATION EXAMPLE 2

Although, in the exemplary embodiment of the invention, the IC card 14 is authenticated based on an ID for identifying an owner and an operation of holding or separating the IC card 14 (FIG. 1) storing the ID over or from the IC card reading device 134, the invention is not limited to this configuration, and may have a configuration in which identification information for identifying an authentication target person is read, and the authentication target person is authenticated based on the identification information, a held-over time, and a separation time.

For example, fingerprint information may be read from the finger of an authentication target person, and the authentication target person may be authenticated based on the fingerprint information and an operation of holding or separating the finger of the authentication target person over or from a fingerprint reading device.

In addition, for example, in a case where authentication for use of a smart phone or the like owned by each person is to be realized, the use of the smart phone may be authenticated based on an operation of putting or separating the finger of the owner on or from a touch panel of the smart phone without using identification information for identifying the owner of the smart phone.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication apparatus comprising:
   a detection unit, executed by a processor, that detects whether or not communication with a portable storage medium storing identification information for identifying a user, is able to be performed;
   a reading unit comprising a hardware sensor that receives data from a card reader over an interface, that reads identification information stored in the portable storage medium when the detection unit detects that the portable storage medium is connected and that the communication is able to be performed;
   a time counting unit, executed by the processor, that counts an elapsed time that is initiated from a starting time determined when the detection unit detects that the communication with the portable storage medium is unable to be performed when the portable storage medium is disconnected to a time when the detection unit detects that the communication is able to be performed again when the portable storage medium is connected again;

a determination unit, executed by the processor, that determines whether or not the elapsed time counted by the time counting unit matches a predefined time for the identification information read by the reading unit; and an authentication unit, executed by the processor, that authenticates the portable storage medium with which the detection unit detects that the communication is able to be performed and that the portable storage medium is connected when the determination unit determines that the elapsed time counted by the time counting unit matches the predefined time, wherein, upon successfully authenticating the portable storage medium, communications is performed, wherein the time counting unit counts each elapsed time for the portable storage medium with which the detection unit at least twice detects that the communication is able to be performed, and wherein the authentication unit authenticates the portable storage medium with which the detection unit detects that the communication is able to be performed when the determination unit determines that the elapsed time counted in each of the predefined number of times matches the predefined time in each of the predefined number of times.

2. The authentication apparatus according to claim 1, wherein, when the elapsed time is counted in a predefined number of times by the time counting unit, the determination unit determines whether or not each elapsed time counted in each of the predefined number of times matches a predefined time in each of the predefined number of times.

3. The authentication apparatus according to claim 1, further comprising:
a display control unit that performs control so as to display a counted time in accordance with counting of time of the time counting unit while the time counting unit counts time.

4. The authentication apparatus according to claim 2, further comprising:
a display control unit that performs control so as to display a counted time in accordance with counting of time of the time counting unit while the time counting unit counts time.

5. An authentication apparatus comprising:
a detection unit, executed by a processor, that detects whether or not communication with a portable storage medium storing identification information for identifying a user, is able to be performed;

a reading unit comprising a hardware sensor that receives data from a card reader over an interface, that reads identification information stored in the portable storage medium when the detection unit detects that the portable storage medium is connected and that the communication is able to be performed;

a first time counting unit, executed by the processor, that counts a first elapsed time from the time when the detection unit detects that the communication with the portable storage medium is able to be performed when the portable storage medium is connected to the time when the detection unit detects that the communication is unable to be performed when the portable storage medium is disconnected;

a second time counting unit, executed by the processor, that counts a second elapsed time from the time when the detection unit detects that the communication with the portable storage medium is unable to be performed when the portable storage medium is disconnected to the time when the detection unit detects that the communication is able to be performed again when the portable storage medium is connected again;

a first determination unit, executed by the processor, that determines whether or not the first elapsed time counted by the first time counting unit matches a predefined first time for the identification information read by the reading unit;

a second determination unit, executed by the processor, that determines whether or not the second elapsed time counted by the second time counting unit matches a predefined second time for the identification information read by the reading unit; and an authentication unit, executed by the processor, that authenticates the portable storage medium with which the detection unit detects that the communication is able to be performed and that the portable storage medium is connected when the first determination unit determines that the first elapsed time counted by the first time counting unit matches the predefined first time and the second determination unit determines that the second elapsed time counted by the second time counting unit matches the predefined second time, wherein, upon successfully authenticating the portable storage medium, communications is performed.

6. The authentication apparatus according to claim 5, wherein the first time counting unit counts each first elapsed time for the portable storage medium with which the detection unit at least twice detects that the communication is able to be performed, wherein, when the first elapsed time is counted in a predefined number of times by the first time counting unit, the first determination unit determines whether or not the each first elapsed time counted in each of the predefined number of times matches a predefined first time in each of the predefined number of times, and wherein the authentication unit authenticates the portable storage medium with which the detection unit detects that the communication is able to be performed when the first determination unit further determines that the first elapsed time counted in each of the predefined number of times matches the predefined first time in each of the predefined number of times.

7. The authentication apparatus according to claim 5, wherein the second time counting unit counts each second elapsed time for the portable storage medium with which the detection unit at least twice detects that the communication is able to be performed, wherein, when the second elapsed time is counted in a predefined number of times by the second time counting unit, the second determination unit determines whether or not the each second elapsed time counted in each of the predefined number of times matches a predefined second time in each of the predefined number of times, and wherein the authentication unit authenticates the portable storage medium with which the detection unit detects that the communication is able to be performed when the second determination unit further determines that the second elapsed time counted in each of the predefined number of times matches the predefined second time in each of the predefined number of times.

8. The authentication apparatus according to claim 6, wherein the second time counting unit counts each second elapsed time for the portable storage medium with which the detection unit at least twice detects that the communication is able to be performed, wherein, when the second elapsed time is counted in a predefined number of times by the second time counting unit, the second determination unit determines whether or not the each second elapsed time counted in each of the predefined number of times matches a predefined second time in each of the predefined number of times, and wherein the authentication unit authenticates the portable storage medium with which the detection unit detects that the communication is able to be performed when the second determination unit further determines that the second elapsed time counted in each of the predefined number of times matches the predefined second time in each of the predefined number of times.

9. The authentication apparatus according to claim 5, further comprising:

a display control unit that performs control so as to display a counted time in accordance with counting of time of the first and second time counting units while the first and second time counting units count time.

10. The authentication apparatus according to claim 6, further comprising:

a display control unit that performs control so as to display a counted time in accordance with counting of time of the first and second time counting units while the first and second time counting units count time.

11. The authentication apparatus according to claim 7, further comprising:

a display control unit that performs control so as to display a counted time in accordance with counting of time of the first and second time counting units while the first and second time counting units count time.

12. The authentication apparatus according to claim 8, further comprising:

a display control unit that performs control so as to display a counted time in accordance with counting of time of the first and second time counting units while the first and second time counting units count time.

13. An authentication method comprising:

detecting whether or not communication with a portable storage medium storing identification information for identifying a user is able to be performed;

reading identification information stored in the portable storage medium when it is detected that the portable storage medium is connected and that the communication is able to be performed;

counting an elapsed time that is initiated from a starting time determined when it is detected that the communication with the portable storage medium is unable to be performed when the portable storage medium is disconnected to a time when it is detected that the communication is able to be performed again when the portable storage medium is connected again;

determining whether or not the counted elapsed time matches a predefined time for the read identification information; and authenticating the portable storage medium with which it is detected that the communication is able to be performed and that the portable storage medium is connected when it is determined that the counted elapsed time matches the predefined time, wherein, upon successfully authenticating the portable storage medium, communications is performed, wherein the time counting unit counts each elapsed time for the portable storage medium with which the detection unit at least twice detects that the communication is able to be performed, and wherein the authentication unit authenticates the portable storage medium with which the detection unit detects that the communication is able to be performed when the determination unit determines that the elapsed time counted in each of the predefined number of times matches the predefined time in each of the predefined number of times.

14. An authentication method comprising:

detecting whether or not communication with a portable storage medium storing identification information for identifying a user is able to be performed;

reading identification information stored in the portable storage medium when it is detected that the portable storage medium is connected and that the communication is able to be performed;

counting a first elapsed time from the time when it is detected that the communication with the portable storage medium is able to be performed when the portable storage medium is connected to the time when it is detected that the communication is unable to be performed when the portable storage medium is disconnected;

counting a second elapsed time from the time when it is detected that the communication with the portable storage medium is unable to be performed when the portable storage medium is disconnected to the time when it is detected that the communication is able to be performed again when the portable storage medium is connected again;

determining whether or not the counted first elapsed time matches a predefined first time for the read identification information;

determining whether or not the counted second elapsed time matches a predefined second time for the read identification information; and authenticating the portable storage medium with which it is detected that the communication is able to be performed and that the portable storage medium is connected when it is determined that the counted first elapsed time matches the predefined first time and it is determined that the counted second elapsed time matches the predefined second time, wherein, upon successfully authenticating the portable storage medium, communications is performed.

15. A non-transitory computer readable medium storing a program causing a computer to execute a process, the process comprising:

detecting whether or not communication with a portable storage medium storing identification information for identifying a user is able to be performed;

reading identification information stored in the portable storage medium when it is detected that the portable storage medium is connected and that the communication is able to be performed;

counting an elapsed time that is initiated from a starting time determined when it is detected that the communication with the portable storage medium is unable to be performed when the portable storage medium is disconnected to a time when it is detected that the communication is able to be performed again when the portable storage medium is connected again;

determining whether or not the counted elapsed time matches a predefined time for the read identification information; and authenticating the portable storage medium with which it is detected that the communication is able to be performed and that the portable storage medium is connected when it is determined that the counted elapsed time matches the predefined time, wherein, upon successfully authenticating the portable storage medium, communications is performed, wherein the time counting unit counts each elapsed time for the portable storage medium with which the detection unit at least twice detects that the communication is able to be performed, and wherein the authentication unit authenticates the portable storage medium with which the detection unit detects that the communication is able to be performed when the determination unit determines that the elapsed time counted in each of the predefined number of times matches the predefined time in each of the predefined number of times.

16. A non-transitory computer readable medium storing a program causing a computer to execute a process, the process comprising:

detecting whether or not communication with a portable storage medium storing identification information for identifying a user is able to be performed;

reading identification information stored in the portable storage medium when it is detected that the portable storage medium is connected and that the communication is able to be performed;

counting a first elapsed time from the time when it is detected that the communication with the portable storage medium is able to be performed when the portable storage medium is connected to the time when it is detected that the communication is unable to be performed when the portable storage medium is disconnected;

counting a second elapsed time from the time when it is detected that the communication with the portable storage medium is unable to be performed when the portable storage medium is disconnected to the time when it is detected that the communication is able to be performed again when the portable storage medium is connected again;

determining whether or not the counted first elapsed time matches a predefined first time for the read identification information;

determining whether or not the counted second elapsed time matches a predefined second time for the read identification information; and authenticating the portable storage medium with which it is detected that the communication is able to be performed and that the portable storage medium is connected when it is determined that the counted first elapsed time matches the predefined first time and it is determined that the counted second elapsed time matches the predefined second time, wherein, upon successfully authenticating the portable storage medium, communications is performed.

* * * * *